Patented Oct. 31, 1933

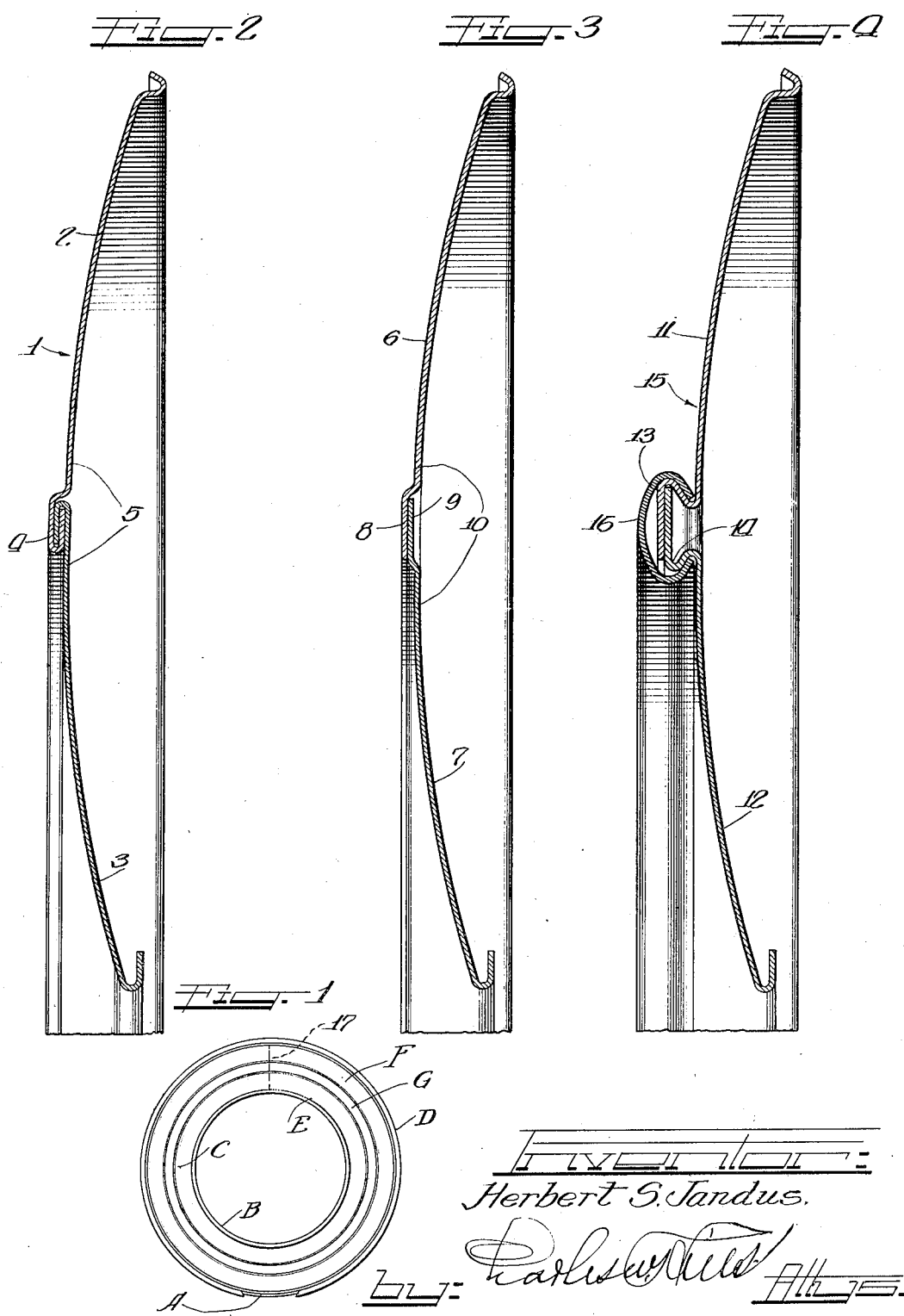

1,933,496

UNITED STATES PATENT OFFICE 1,933,496

SIDE PLATE FOR METAL TIRE COVERS AND METHOD OF MAKING THE SAME

Herbert S. Jandus, Detroit, Mich., assignor to Lyon Cover Company, Detroit, Mich., a corporation of Michigan Application November 5, 1930
Serial No. 493,527

9 Claims. (Cl. 113—116)

This invention relates to tire covers of the type made of metal, and more particularly pertains to the construction of what is known as a side plate forming a part of a two-piece tire cover of which the second part is a resilient member adapted to encircle the tire and hold itself and the side plate on the tire.

In the manufacture of side plates of the character referred to, the process heretofore employed involves the use of a square piece of sheet metal from which the side plate, which is annular, is severed in a die machine. This involves a very large amount of waste, including a central circular portion which is equal in diameter substantially to that of the wheel in connection with which the side plate is to be used. It is found in actual practice that the amount of metal which goes to waste in this process is well in excess of the amount going to make up the side plate. Another objectionable feature which is of no little importance resides in the fact that costly dies and very expensive machinery must be used in order to stamp out the side plates. Heretofore, this expensive process has been in vogue simply because no satisfactory method had been arrived at for reducing the cost of manufacture. This subject, however, has been given considerable study as a result of which I have arrived at a solution by which the cost of manufacture of these side plates is tremendously reduced.

It has been proposed to make the side plates by a rolling operation, rather than by the employment of dies, but such a process would be very expensive in view of the fact that in practice the side plates are in the neighborhood of five inches in width, so that the stresses set up in the metal in bending the same into circular form would tend to distort the metal to an excessive and undesirable degree.

It is accordingly one of the principal objects of the invention to employ a process of manufacture of a side plate of the character referred to, which process involves a decided reduction in the cost of manufacture as compared to the present process.

A further object of the invention resides in the provision of a composite side plate having all the desirable characteristics of a plate which is made in one piece.

A further object of the invention is to provide a composite metal tire cover side plate which embodies stiffening or reinforcing means.

Another object of the invention resides in the provision of a composite side plate for a tire cover, which plate embodies protruding reinforcing means which will in no way interfere with the proper contact between the plate and the side wall of a tire.

A still further object of the invention involves the provision of a two-part side plate for a metal tire cover, which plate involves an inexpensive process of manufacture and which may be provided with means which will reinforce the same and enhance the appearance thereof.

In carrying out the invention, according to one form, a pair of strips of sheet metal are rolled into circular form and are arranged concentric and overlapped, the overlapping portions being suitably interlocked or otherwise connected and offset from said strips, whereby the composite plate thus formed is stiffened by the offset portions, the latter serving also as molding or beading to enhance the appearance of the plate. The meeting ends of the strips are then permanently fastened by welding and when the burr is ground off, the plate has the appearance, and practically consists, of a single piece of material. The resulting plate is preferably somewhat concave in cross section in order that there may be a substantial surface contact between the concave wall of the plate and the corresponding side wall of the tire. In view of the fact that the individual strips are substantially half as wide as the resultant plate, or in other words in the neighborhood of two and one half or three inches, the stresses set up therein during the rolling operation are not sufficient to undesirably distort the same. If desirable, the side plates may be formed of a greater number of strips, each rolled in the same way and all interlocked and fastened in the same way or in any other suitable manner.

Other and further important objects of this invention will be apparent from the disclosures in the specification and the accompanying drawing.

This invention (in a preferred form) is illustrated in the drawing and hereinafter more fully described.

On the drawing:

Figure 1 illustrates a tire cover embodying the invention and applied to a tire and wheel.

Figures 2, 3 and 4 are enlarged fragmentary sectional views of side plates constructed in accordance with different forms of the invention.

Referring now more particularly to the drawing, wherein the same part is indicated by the same reference character, a tire indicated at A mounted on a rim B is shown encased in a metal tire cover embodying the invention. This cover involves a side plate C which is somewhat concave in cross section to engage the side wall of the tire A, and a resilient split ring D adapted to almost completely encircle the tread of the tire A and somewhat overlapping the outer peripheral edge of the side plate C, the ring D being also concave in cross section and serving by its resilience to hold itself and the side plate C tightly on the tire A. The side plate C is in reality formed of concentric ring members E and F, the beading or interlocked portions of the rings E and F being indicated at G. It will be apparent that, for all intents and purposes, the side plate C has exactly the same appearance in practice as an integral side plate provided with molding as shown at G would have. Yet, by constructing the same of a plurality of strips, I am enabled to achieve the same results at a tremendously reduced cost of manufacture.

Referring now more particularly to the various forms in which the invention may be embodied, Figure 2 illustrates a side plate 1 comprising an outer strip 2 and an inner strip 3. The strips 2 and 3 are overlapped at their inner and outer edges respectively to form a lock seam 4, the parts 2 and 3 being concave to provide a substantially continuous concave surface 5, the seam 4 extending laterally on the convex side. If desired, as a precaution, the overlapped portions may be welded to each other. Thus a unitary side plate is provided having substantially the same characteristics as a side plate made in one piece, and in fact has the advantage in that the seam 4 reinforces the side plate and also serves to improve the appearance of the same inasmuch as it consitutes in effect beading or molding.

In the form of the invention shown in Figure 3, the outer strip 6 and inner strip 7 are provided with overlapping offset portions 8 and 9 respectively which are preferably spot or otherwise welded or fastened. The resultant construction is substantially the same as that shown in Figure 2, and it will be noted that the portion 9 is offset from the surface 10 for the reason that any burrs forming thereon by reason of the process of welding will not project inwardly beyond the surface 10 and will therefore not interfere with the contact between the surface 10 and the side wall of the tire in connection with which it is used. It will be noted that the strips 6 and 7 are complementarily concaved as shown in order to properly accommodate the side wall of the tire.

In a further form of the invention as shown in Figure 4 the outer and inner strips 11 and 12 have substantially Z-shaped overlapping portions 13 and 14 respectively. These portions are preferably spot welded to form a composite side plate indicated generally at 15, the overlapping portions providing combined stiffening and molding or beading means as in the case of the forms shown in Figures 2 and 3. It may be desirable to employ independent beading or molding in connection with the side plate 15, and it is for this reason that the Z-shape is imparted to the overlapping portions 13 and 14. The portions 13 and 14 constitute in effect a dove-tail, over which resilient molding or beading 16 may be snapped into the position shown in Figure 4. The beading 16 will thus serve not only to enhance the appearance of the side plate 15 but in addition will serve as additional or auxiliary stiffening means to maintain the plate 15 in its proper shape.

In order to complete the side plate, which is to be in the form of a ring as seen in Figure 1, the ends of the same are brought together and preferably spot welded and the burrs formed thereby ground off, so that the resulting side plate will be in effect an integral ring. The dotted line indicated at 17 in Figure 1 is included simply to illustrate by way of example where the ends of the plate C were welded, since in actual practice this will be invisible when the tire cover is completed for commercial use.

If desired, two or more pieces may be availed of in constructing each of the outer and inner circles, in which event, of course, the amount of rolling to which each piece is subject will be considerably reduced and practically no waste will occur.

I am aware that many changes may be made and numerous details of construction may be varied through a wide range without departing from the principles of this invention, and I, therefore, do not purpose limiting the patent granted hereon otherwise than necessitated by the prior art.

The process described herein for making the side plate is applicable also to the making of the outer resilient ring, and of any other shape of structure desired.

The outer peripheral lip of each side plate is adapted to be crimped to receive a slightly protruding rubber strip which serves when in use as an anti-rattler between the side plate and the outer ring.

Each strip may be concave and provided with its flange and rolled into circular form in separate operations, or these operations may be performed simultaneously in a manner which will be apparent to one skilled in the art.

I claim as my invention:

1. In a tire cover, an annular plate adapted to cover a side wall of a tire, said plate comprising a plurality of interlocked concentric metal strips, the ends of the strips being joined to form a single continuous ring, said ring being concavo-convex in cross section to conform approximately to the curvature of the side wall of a tire, the concave surface consisting of the inner walls of the strips being substantially uninterrupted, the interlocked portions protruding beyond the convex surfaces of the strips and forming a reinforcing means therefor, said portions serving also in the capacity of beading or molding to enhance the appearance of said ring.

2. An annular side plate for a tire cover, said plate comprising a plurality of substantially concentric strips of sheet metal having lapped portions welded together to thereby form a unitary ring, said plate being transversely concaved to conform generally with the side wall of a tire, and said portions being offset from said strips in a direction removed from the concave surface of the plate, thereby forming an annular cavity in the concave surface of the plate, so that burrs formed on the interior surface of the inner portion will not project beyond the concave surface of the plate.

3. An annular side plate for a tire cover, said plate comprising a plurality of substantially concentric strips of sheet metal having lapped portions welded together to thereby form a unitary ring, said plate being transversely concaved to conform generally with the side wall of a tire, and said portions being offset from said strips in a direction removed from the concave surface of the plate, thereby forming an annular cavity in the concave surface of the plate so that burrs formed on the interior surface of the inner portion will not project beyond the concave surface of the plate, the portions constituting a stiffening rib for the plate.

4. An annular side plate for a tire cover, said plate comprising a plurality of substantially concentric strips of sheet metal having overlapping portions welded together to thereby form a unitary ring, said plate being transversely concaved to conform generally with the side wall of a tire, and said overlapping portions being offset from said strips in a direction removed from the concave surface of the plate, thereby forming an annular cavity in the concave surface of the plate, so that burrs formed on the interior surface of the under overlapped portion will not project beyond the concave surface of the plate, said offset portions forming with their respective strips annular pockets, and substantially C-shaped resilient molding snapped over the offset portions so that the ends of the molding lie in the said pockets.

5. A side plate for a tire cover, said plate comprising concentric strips of sheet metal, the adjacent peripheral portions of said strips being overlapped and welded together, and forming a substantially dove-tailed projection, and moulding in covered relation to said dove-tailed projection, said molding having edges disposed adjacent the neck of the dove-tailed projection and thereby interlocked therewith.

6. The method of forming a composite side plate for a tire cover, which comprises simultaneously rolling a strip of sheet metal into the form of a circle and providing the inner periphery of the strip with an offset flange and imparting to the strip a concavo-convex shape in cross-section, simultaneously rolling a second strip of sheet metal into the form of a circle whose outer diameter is somewhat greater than the inner diameter of the first strip and forming a complemental offset flange on the outer periphery of the second strip and imparting to the same a shape corresponding with that of the first strip, welding said flanges to each other, and welding the meeting ends of the strips together.

7. The method of forming a composite side plate for a tire cover, which comprises rolling a strip of sheet metal into the form of a circle, providing the inner periphery of the strip with an offset flange, imparting to the strip a concavo-convex shape in cross-section, rolling a second strip of sheet metal into the form of a circle whose outer diameter is somewhat greater than the inner diameter of the first strip, forming a complemental offset flange on the outer periphery of the second strip, imparting to the same a shape corresponding with that of the first strip, and uniting said flanges and the meeting ends of the strips.

8. In a tire cover, a substantially planar face ring of rigid form sustaining material having a complete and substantially circular edge portion and a molding receiving, surrounding, binding, protecting and ornamenting said portion comprising a resiliently deeply channeled ring of metal or the like having an inherent tendency to spring as it is snapped into place on and receive said portion in order to lock and secure itself on said portion by its own resiliency and the rigidity of said portion.

9. In a tire cover, an arcuate member of relatively rigid form sustaining material having a substantially circular edge portion, and a molding receiving said portion comprising a resilient channeled ring of metal or the like having an inherent tendency to spring as it is snapped into place on and receive said portion in order to lock and secure itself on said portion by its own resiliency and the rigidity of said portion.

HERBERT S. JANDUS.